United States Patent [19]
Bauer et al.

[11] Patent Number: 5,782,487
[45] Date of Patent: Jul. 21, 1998

[54] GAS GENERATOR

[75] Inventors: Hermann Bauer, Heidenheim; Franz Fürst, Grossmehring, both of Germany

[73] Assignee: TEMIC Bayern-Chemie Airbag GmbH, Aschau am Inn, Germany

[21] Appl. No.: 850,177

[22] Filed: May 2, 1997

[30] Foreign Application Priority Data

May 4, 1996 [DE] Germany .............. 196 18 040.6

[51] Int. Cl.[6] .................................. B60R 21/26
[52] U.S. Cl. .......................... 280/741; 102/530
[58] Field of Search ................. 280/741, 736; 102/530, 531, 202, 202.14; 422/164, 165; 222/3

[56] References Cited

U.S. PATENT DOCUMENTS

| | | | |
|---|---|---|---|
| 4,131,299 | 12/1978 | Ono et al. | 280/736 |
| 4,907,819 | 3/1990 | Cuevas | 289/736 |
| 5,100,174 | 3/1992 | Jasken et al. | 280/741 |
| 5,189,255 | 2/1993 | Fukabori et al. | 102/531 |
| 5,201,542 | 4/1993 | Thuen et al. | 280/736 |
| 5,564,742 | 10/1996 | Clark et al. | 280/740 |
| 5,624,133 | 4/1997 | Wong | 280/741 |

FOREIGN PATENT DOCUMENTS 0705739  4/1996  European Pat. Off. .
478638A  3/1992  Japan .

Primary Examiner—Christopher P. Ellis
Attorney, Agent, or Firm—Tarolli, Sundheim, Covell, Tummino & Szabo

[57] ABSTRACT

A gas generator (10) which generates propellant gas for inflating a gas bag in an air bag system comprises a housing (11) having a combustion chamber (21) which is formed by an upper part (12) of the housing and a lower part (13) of the housing in the interior of the housing (11), discharge openings (32) in the housing (11) for the exit of the propellant gas from the housing (11) into the gas bag, a filter device (30) upstream of the discharge openings (32) and an ignition device (23) for igniting a solid propellant (22) contained in the combustion chamber (21), the propellant gas escaping from the combustion chamber (21) being directed out of the housing (11) via flow chambers (29). The combustion chamber (21) is formed by an interior space of a tubular insert (18) which is fixedly held between the upper part (12) of the housing and the lower part (13) of the housing, and the tubular insert (18) comprises outlet openings (32) into an annular flow chamber (29) between the tubular insert (18) and the housing (11). The tubular insert (18) has tabs (27) bent radially outwards which, on the one hand, form the outlet openings (28) and, on the other hand, serve as a means for holding the filter device.

7 Claims, 2 Drawing Sheets

5,782,487

1
GAS GENERATOR

BACKGROUND OF INVENTION

The invention relates to a gas generator which generates propellant gas for inflating a gas bag in an air bag system, comprising a housing having outflow openings for the exit of the propellant gas from the housing into the gas bag, a filter device upstream of the outflow openings and an ignition device for igniting a solid propellant contained in the combustion chamber, the propellant gas escaping from the combustion chamber being directed out of the housing via flow chambers, a combustion chamber formed in the interior of the housing by an upper part of the housing, a lower part of the housing as well as by an interior space of a tubular insert which is fixedly held between the upper part of the housing and the lower part of the housing, the tubular insert comprising outlet openings into an annular flow chamber between the tubular insert and the housing, and means being provided at the outer peripheral surface of the tubular insert for holding the filter device between the tubular insert and the housing.

A gas generator of this type is known, for example, from U.S. Pat. No. 5,189,255.

Air bag systems are incorporated into vehicles in order to reduce the kinetic energy of the vehicle occupants in the case of a collision accident of the vehicle and to protect the vehicle occupants from hitting against hard interior parts of the vehicle, such as, for example, the steering wheel or side coverings of the vehicle doors. When a sensor unit of the air bag system senses a collision accident of the vehicle, a propellant, mostly provided in tablet form, is ignited inside the gas generator, the propellant being burned down under high pressure in the combustion chamber housing and thus producing a propellant gas. This propellant gas serves to fill a gas bag which the vehicle occupant hits in a collision accident.

Gas generators having an axial overall height which is smaller than the radial diameter of the gas generator are referred to as so-called round gas generators.

A gas generator known from DE-A-4,135,299 comprises a two-piece housing, the two parts of which are screw connected to each other. A combustion chamber is provided in the axisymmetrically configured housing, the combustion chamber containing a solid propellant in tablet form. In the case of a vehicle accident an ignition unit in the vicinity of the combustion chamber is activated by an electrical current pulse, the ignition unit igniting the propellant. The propellant burns down under high pressure and the propellant gas thus generated escapes to the outside via radial outlet openings in a combustion chamber housing, flows through flow chambers defined by flow sheets, is purified in a filter unit and flows via outlet openings of a coating sheet from the gas generator into the gas bag.

In the process, the flow sheets form, on the one hand, a cyclone effecting as desired a controlled guidance for the propellant gas, resulting not only in a multiple flow deflection but also in a separation of small particles. On the other hand, the flow sheets serve the purpose of holding each other in spaced relation, enabling a sufficiently pressure-reduced gas to flow into and through the filter device. These flow sheets have to be placed in respective seats in both housing parts even before the upper part of the housing is screwed to the lower part of the housing, and they have to be kept in a fixed position and protected from jamming while the two housing parts are screwed together. The assembly of the gas generator is therefore done by hand involving considerable expense, or complex devices for assembling the gas generator have to be provided. Since the flow chambers in the case of the known gas generator are formed by at least four flow sheets, the number of individual components required for the gas generator is correspondingly high. In addition, the configuration of the special shapes of the flow sheets necessitates a costly production.

From DE 4,317,727 a gas generator is known comprising a substantially pot-shaped two-piece housing. In the interior of the housing designed as combustion chamber an ignition device for igniting a pyrotechnic charge is provided, the combustion gases of which escape through outlet openings from the combustion chamber and are led via flow chambers to a filter device before flowing from the gas generator into the gas bag. This known gas generator includes a multitude of individual components, and particularly the flow chambers and the filter device are configured outside the combustion chamber housing proper, thus requiring additional fastening parts.

From U.S. Pat. No. 5,189,255 a round gas generator having a tubular insert is known which insert comprises outlet openings as well as means at its outer peripheral surface for holding the filter device between the tubular insert and the housing. These means are formed by an annular flange projecting radially outwards and having tooth-like extensions. The tubular insert, whose geometry and, thus, manufacture are very complicated, increases the costs of the housing.

SUMMARY OF INVENTION

The invention provides a housing for a gas generator which can be produced simply and inexpensively. This is achieved with the insert of the type as mentioned at the outset in that the tubular insert has tabs bent radially outwards which, on the one hand, form the outlet openings in the tubular insert and, on the other hand, serve as means at the outer peripheral surface of the tubular insert for holding the filter device.

The gas generator according to the invention has thus the important advantage that the number of individual components is considerably reduced due to the simplified construction of the gas generator, resulting in a cost-effective production. The tubular insert forms the combustion chamber and the flow guidance for the propellant gases escaping from the combustion chamber as well as also the mounting for the filter device. The tubular insert need not be connected to the housing parts themselves but can be easily fixed in the housing by corresponding interlocking connections when the upper part and the lower part of the housing are joined together. This simple interconnection technique still further simplifies the assembly of the gas generator as well as reduces the weight of the gas generator.

The outlet openings in the tubular insert are formed by means of the tabs, bent radially outwards, of the tubular insert. By making axial incisions in a tube, the sections between adjacent incisions may be easily bent to form, for example, tabs projecting radially outwards at right angles. The axial depth of the incisions corresponds approximately to the radial extent of the flow chamber between the gas generator housing and the tubular insert. The tabs serve, on the one hand, as flow baffle plates for the propellant gases flowing into the flow chamber so that the flow path traveled by the propellant gases until the exit from the housing is extended and the gases are better cooled and are further purified by the depositing of hot particles. On the other hand, the filter device may be arranged in the housing in a particularly simple manner in that it rests on the bent tabs, especially directly upstream of the outflow openings of the gas generator.

A further embodiment is characterized in that the filter device upstream of the outlet openings of the housing is also configured as heat insulation. This heat insulation prevents the heat from flowing out of the generator housing into the gas bag via the discharge openings.

In a further preferred embodiment a preliminary filter device is provided in the combustion chamber directly upstream of the outlet openings of the tubular insert. This preliminary filter device serves, on the one hand, to fix the solid propellant contained in the combustion chamber and, on the other hand, also simultaneously as a cooling and filtering medium.

In a preferred embodiment this preliminary filter device is configured annularly so as to interlockingly engage the tubular insert. Thus, provision need not be made for a special mounting for the preliminary filter device in the combustion chamber.

A further embodiment consists in the provision of a filling material in the combustion chamber for fixing the solid propellant. Thereby, the solid propellant, usually provided in tablet form, may be packed on all sides and in particular also densely, whereby a rattling of the tablets is avoided when vibrating the gas generator in the case of use in a moving vehicle.

Further, a pre-ignition device is preferably disposed in the combustion chamber. The temperature of self-ignition of the propellants used nowadays is about 400° C.; besides, gas generator housings are today made mostly of an aluminum alloy which is known to have a low strength at high temperatures. For this reason, for passing a fire test prescribed under the law, this type of gas generator requires the incorporation of a pre-ignition device which causes the propellant to ignite as early as at a temperature of below 400° C., but above typical application temperatures of up to 100° C.

In a further advantageous embodiment the upper and lower parts of the housing are connected to each other by a radial riveted joint. A connection of this kind is particularly easy to design and may be simply made automatically.

In a further embodiment an annular fastening flange is disposed at the outer periphery of the housing such that the latter may, for example, be screwed to the air bag module via a screw connection.

Further advantages of the invention are apparent from the description and the drawings. Likewise, according to the invention the features mentioned above and those listed further below may each be used separately, or any desired combination of a plurality of the features may be used. The embodiment shown and described herein is not to be construed as a complete enumeration; rather, it should be regarded as being exemplary for describing the invention.

One embodiment of the invention is shown in the drawings and is described in greater detail in the description below. The drawing figures should not necessarily be considered as being to scale.

DETAILED DESCRIPTION

Figure 3:
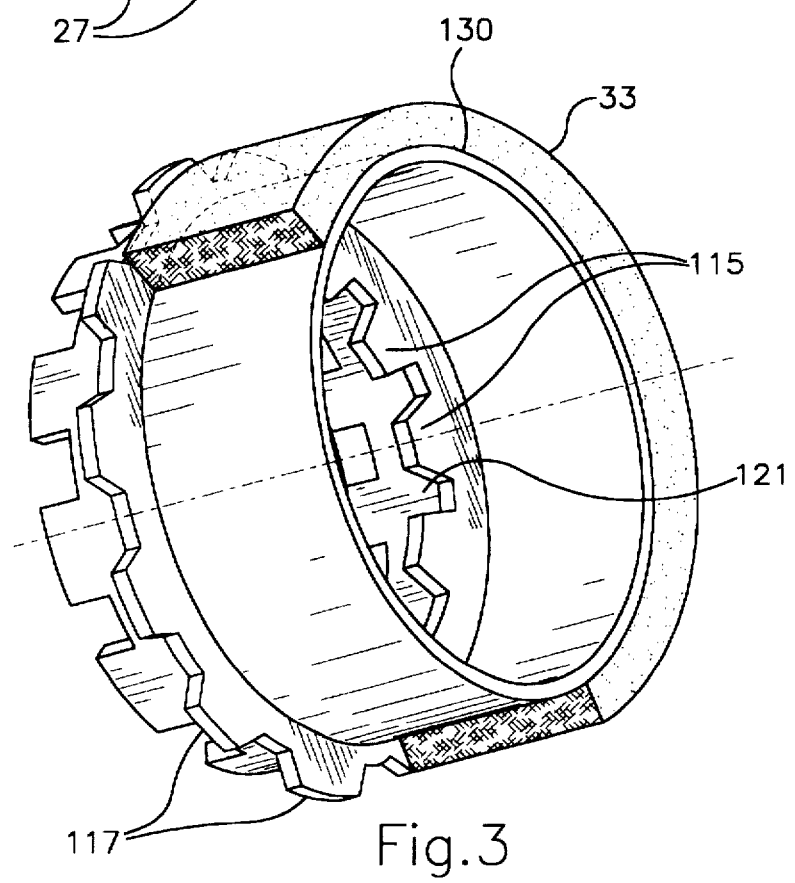
FIG. 3 is a corresponding view of the insert shown in U.S. Pat. No. 5,189,255.

Reference is first made to FIG. 3, which shows a known insert of a gas generator according to the prior art. The tubular insert has outlet openings at its outer peripheral surface and a radially outwardly projecting annular flange having tooth-like extensions 117. The annular flange and the outer peripheral surface 130 define a filter 33. Within the tube a further annular flange is provided having radially inwardly extending tines 115 such that openings 121 are each formed between neighboring tines 115. The tubular insert has a very complicated geometry, which makes it costly to produce.

Figure 1:
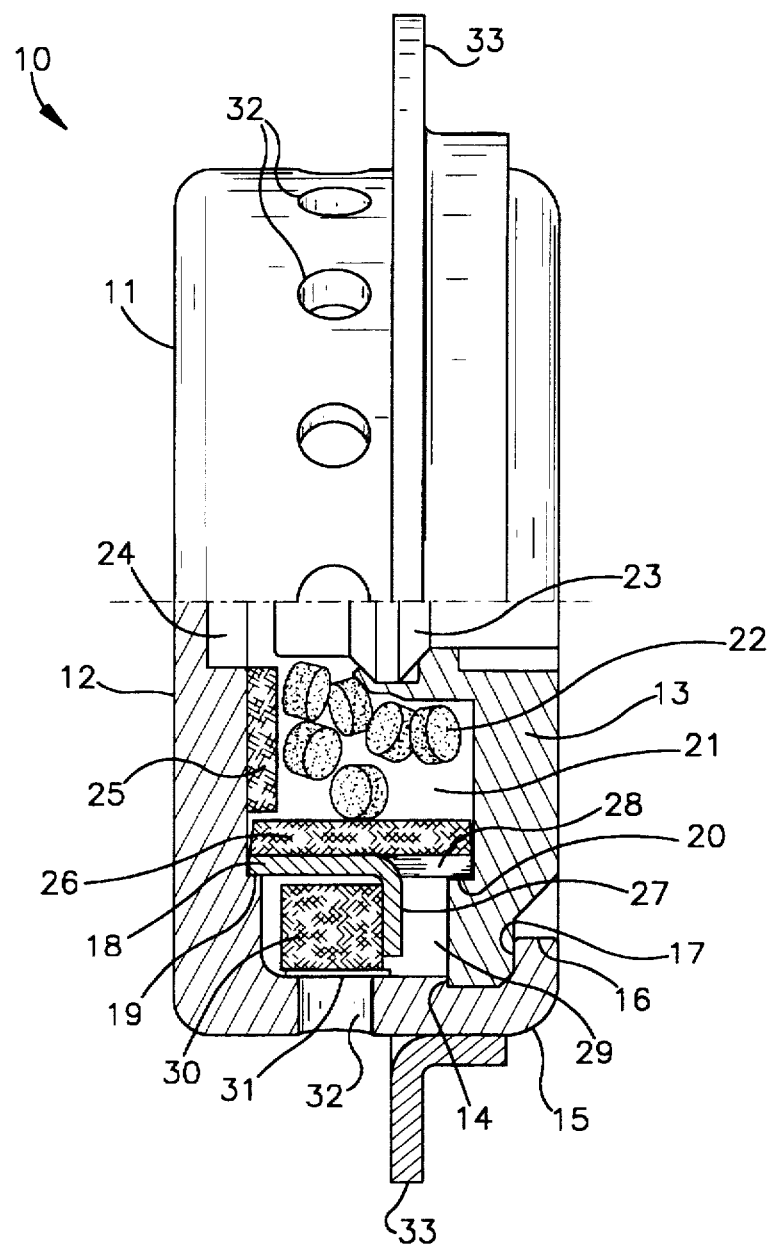
FIG. 1 shows a highly diagrammatized half-side longitudinal cross section of an embodiment of the invention with the mounting integrated therein.

FIG. 1 shows a gas generator 10 according to the invention having a housing 11 which substantially consists of a pot-like upper part 12 of the housing and a bottom-shaped lower part 13 of the housing. The inner surface of the lower part 13 of the housing engages a bearing surface 14 of the upper part 12 of the housing. The lower part 13 of the housing is fastened to the upper part 12 of the housing via a radial riveting joint 15 by bending the free axial ends 16 of the upper part 12 of the housing inwards onto to outer surface 17 of the lower part 13 of the housing.

A tubular insert 18 is arranged in a fixed position resting against axial protrusions 19, 20 of the upper and lower parts 12, 13 of the housing, respectively, within the interior space defined by the upper part 12 of the housing and the lower part 13 of the housing. The space enclosed by the tubular insert 18, the upper part 12 of the housing and the lower part 13 of the housing constitutes a combustion chamber 21 containing a solid propellant 22 in the form of tablets. Also in the combustion chamber 21, an ignition device 23 is fastened to the lower part 13 of the housing and an early ignition unit 24 is fastened to the upper part 12 of the housing. Moreover, a filling material 25 is disposed in the combustion chamber 21 which fills the free space in the combustion chamber 21, so as to prevent the propellant 22 from clattering or rattling. A first annular filter member 26 engages the tubular insert 18 in the combustion chamber 21.

Figure 2:
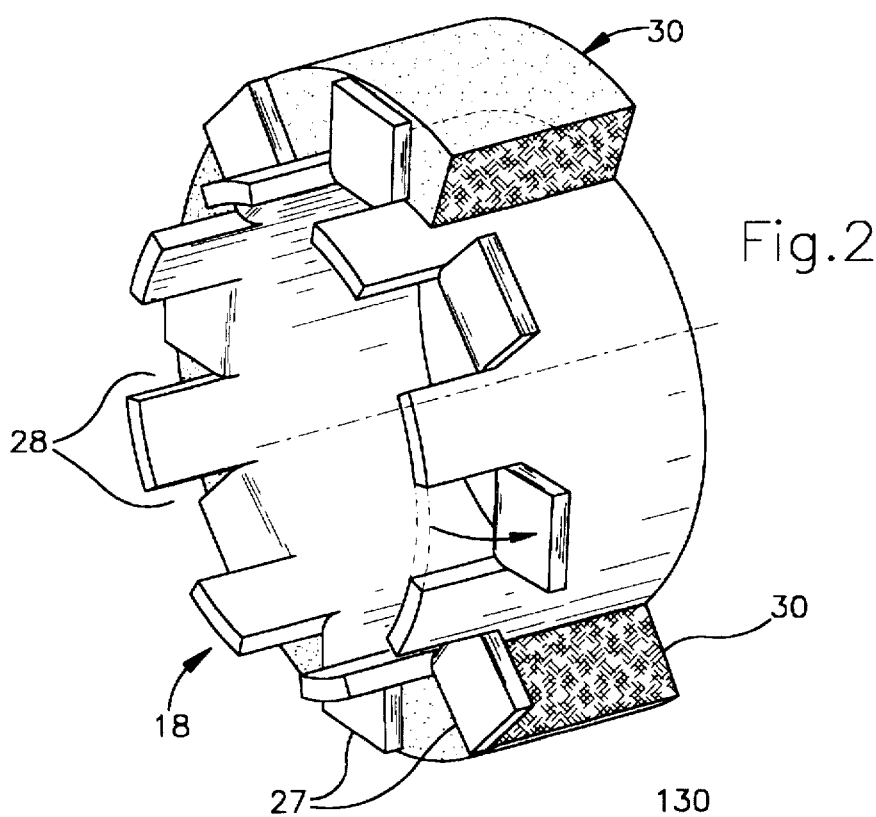
FIG. 2 is a perspective view of the tubular insert of the generator according to the invention.

The tubular insert 18 comprises tabs 27 bent radially outwards (cf. FIG. 2) which are bent off its peripheral surface and thus form outlet openings 28 out of the combustion chamber 21 into a flow chamber 29. A second annular filtering and cooling member 30 including an insulation 31 rests on the bent tabs 27. This insulation 31 prevents the heat from flowing out of the gas generator housing 11 and over into a gas bag (not shown) via the discharge openings 32. The flow chamber 29 is configured with the gas bag via discharge openings 32 in the upper part 12 of the housing. Furthermore, at the outer surface of the upper part 12 of the housing a fastening flange 33 is provided which is adapted to connect the gas generator 10 with an air bag module.

When a sensor unit (not shown in the figures) of the air bag system senses a vehicle collision involving a hard impact of the vehicle, the ignition unit 23 of the gas generator 10 is activated, so that the propellant 22 ignites within the combustion 21 and may burn down. The combustion of the propellant 22 causes a propellant gas to develop which is filtered by the preliminary filter device 26 and enters into the flow chamber 29 through the outlet openings 28 of the tubular insert 18.

In the process, the hot propellant gas escaping from the combustion chamber 21 is cooled down both by the preliminary filter device 26 and at the walls within the flow chamber 29. This cooling process and the reduced flow rate within the flow chamber 29 cause hot particles within the propellant gas to change their state of aggregation from gaseous to solid, and the particles condense at the inner walls of the flow chamber 29. The propellant gas escapes through the discharge openings 32 of the gas generator 10 via the annular filter 30 and the insulation 31 and in the direction toward the gas bag (not shown). The insulation 31 further cools down the propellant gas before it exits through the discharge openings 32.

The pre-ignition unit 24 is provided for the propellant to ignite automatically in a controlled manner when a certain limit temperature is exceeded, without the occurrence of a vehicle accident.

We claim:

1. A gas generator (10) which generates propellant gas for inflating a gas bag in an air bag system, comprising a housing (11) having discharge openings (32) for the exit of the propellant gas from the housing (11) into the gas bag, a filter device (30) upstream of the discharge openings (32) and an ignition device (23) for igniting a solid propellant (22) contained in the combustion chamber (21), the propellant gas escaping from the combustion chamber (21) being directed out of the housing (11) via flow chambers (29), a combustion chamber (21) formed in the interior of the housing (11) by an upper part (12) of the housing, a lower part (13) of the housing as well as by an interior space of a tubular insert (18) which is fixedly held between the upper part (12) of the housing and the lower part (13) of the housing, the tubular insert (18) comprising outlet openings (28) into the annular flow chamber (29) between the tubular insert (18) and the housing (11), and means being provided at the outer peripheral surface of the tubular insert (18) for holding the filter device (30) between the tubular insert (18) and the housing (11), characterized in that the tubular insert (18) comprises tabs (27) bent radially outwards which form the outlet openings (28) in the tubular insert (18) and, serve as a means at the outer peripheral surface of the tubular insert (18) for holding the filter device (30).

2. The gas generator according to claim 1, characterized in that a preliminary filter device (26) is provided in the combustion chamber (21) directly upstream of the outlet openings (28) in the tubular insert (18).

3. The gas generator according to claim 2, characterized in that the preliminary filter device (26) is configured annularly.

4. The gas generator according to claim 1, characterized in that a filling material (25) for fixing the solid propellant (22) is provided in the combustion chamber (21).

5. The gas generator according to claim 1, characterized in that a pre-ignition device (24) is arranged in the combustion chamber (21).

6. The gas generator according to claim 1, characterized in that the upper part (12) of the housing and the lower part (13) of the housing are connected to each other by means of a radial riveted joint (15).

7. The gas generator according to claim 1, characterized in that an annular fastening flange (33) is disposed at the outer periphery of the housing (11).

* * * * *